United States Patent
Ma et al.

(10) Patent No.: US 9,119,084 B2
(45) Date of Patent: Aug. 25, 2015

(54) METHOD AND BASE STATION FOR COORDINATING CELL INTERFERENCE

(71) Applicant: HUAWEI TECHNOLOGIES CO., LTD., Shenzhen, Guangdong (CN)

(72) Inventors: Ni Ma, Shanghai (CN); Qunfang Lou, Shanghai (CN); Michael Grieger, Dresden (DE); Patrick Marsch, Dresden (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 120 days.

(21) Appl. No.: 14/092,116

(22) Filed: Nov. 27, 2013

(65) Prior Publication Data

US 2014/0086148 A1    Mar. 27, 2014

Related U.S. Application Data

(63) Continuation of application No. PCT/CN2011/074753, filed on May 27, 2011.

(51) Int. Cl.
*H04W 24/02* (2009.01)
*H04B 7/02* (2006.01)
*H04W 72/04* (2009.01)
*H04W 72/08* (2009.01)

(52) U.S. Cl.
CPC .............. *H04W 24/02* (2013.01); *H04B 7/024* (2013.01); *H04W 72/0426* (2013.01); *H04W 72/082* (2013.01)

(58) Field of Classification Search
None
See application file for complete search history.

(56) References Cited

U.S. PATENT DOCUMENTS

| 2008/0233967 | A1* | 9/2008 | Montojo et al. ........... 455/452.2 |
| 2010/0103821 | A1* | 4/2010 | Palanki et al. ................ 370/241 |
| 2010/0128689 | A1 | 5/2010 | Yoon et al. .................... 370/329 |

(Continued)

FOREIGN PATENT DOCUMENTS

| CN | 101132632 A | 2/2008 |
| CN | 101373998 A | 2/2009 |

(Continued)

OTHER PUBLICATIONS

International Search Report issued Mar. 1, 2012, in corresponding International Patent Application No. PCT/CN2011/074753.

(Continued)

*Primary Examiner* — Hong Cho
(74) *Attorney, Agent, or Firm* — Staas & Halsey LLP

(57) ABSTRACT

Embodiments of the present invention disclose a method and a base station for coordinating cell interference. The method includes: receiving each backhaul signal transmitted by each cooperative base station, where the backhaul signal is determined by the cooperative base station according to strength of a signal received from a served user and strength of a signal received by a serving base station from an interfering user in the cooperative base station; and combining, at different stages of baseband processing and according to a type of each backhaul signal, a backhaul signal of a corresponding type and a user signal received from each user. An embodiment of the present invention further provides a base station. According to the embodiments of the present invention, backhaul transmission capacity is maximally utilized, backhaul transmission efficiency is improved, and relatively high performance is obtained.

16 Claims, 3 Drawing Sheets

(56) References Cited

U.S. PATENT DOCUMENTS

2012/0020319 A1    1/2012  Song et al. .................. 370/330
2012/0281588 A1*  11/2012  Damnjanovic ............... 370/252

FOREIGN PATENT DOCUMENTS

| CN | 101394210 A   | 3/2009 |
| CN | 101459633 A   | 6/2009 |
| CN | 101754262 A   | 6/2010 |
| CN | 102026207 A   | 4/2011 |
| EP | 2 273 691 A1  | 1/2011 |
| JP | 11-177572     | 7/1999 |
| WO | 2010/034528 A1| 4/2010 |
| WO | 2010/034571 A1| 4/2010 |

OTHER PUBLICATIONS

Chinese Search Report issued Aug. 6, 2013, in corresponding Chinese Patent Application No. 201180000589.X.

R3-091781, "Overview of inter-eNB CoMP impact on RAN3," 3GPP TSG RAN WG3 #65, Aug. 24-28, 2009, pp. 1-4, Agenda Item 13.3, Huawei, Shenzhen, China.

Extended European Search Report issued Apr. 15, 2014, in corresponding European Patent Application No. 11783019.0.

Office Action mailed Jan. 13, 2015 for corresponding Japanese Patent Application No. 2014-511700.

I2R, "Opportunistic uplink coordinated multi-point reception for LTE-A," 3GPP TSG RAN WG1 Meeting # 57, May 2009.

Alcatel-Lucent Shanghai Bell, "Uplink coordinated multi-point reception with distributed intercell interference suppression for LTE-A," 3GPP TSG RAN WG1 Meeting # 58, Aug. 2009.

\* cited by examiner

| A serving base station receives each backhaul signal transmitted by each cooperative base station, where the backhaul signal is determined by the cooperative base station according to strength of a signal received from a served user and strength of a signal received by a serving base station from an interfering user in the cooperative base station | ~101 |

| The serving base station combines, at different stages of baseband processing and according to a type of each backhaul signal, a backhaul signal of a corresponding type and a user signal received from each user | ~102 |

FIG. 1

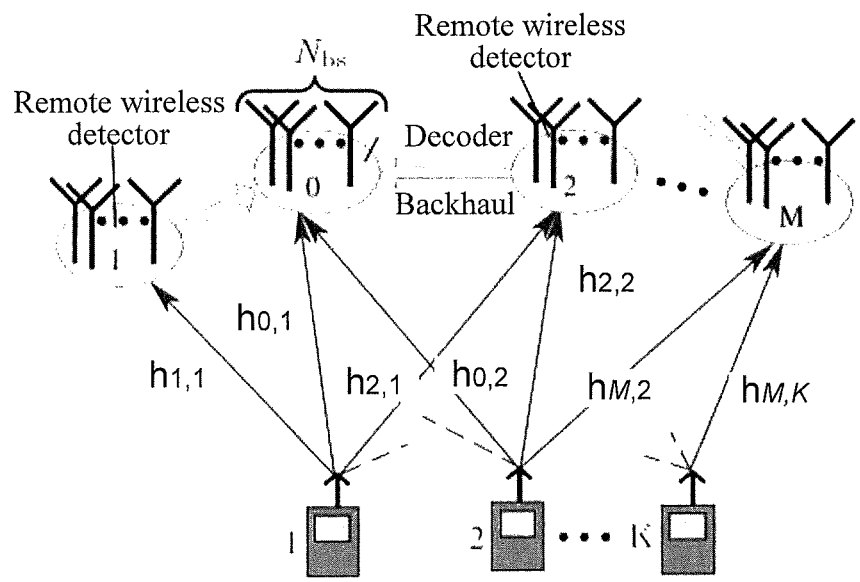

FIG. 2

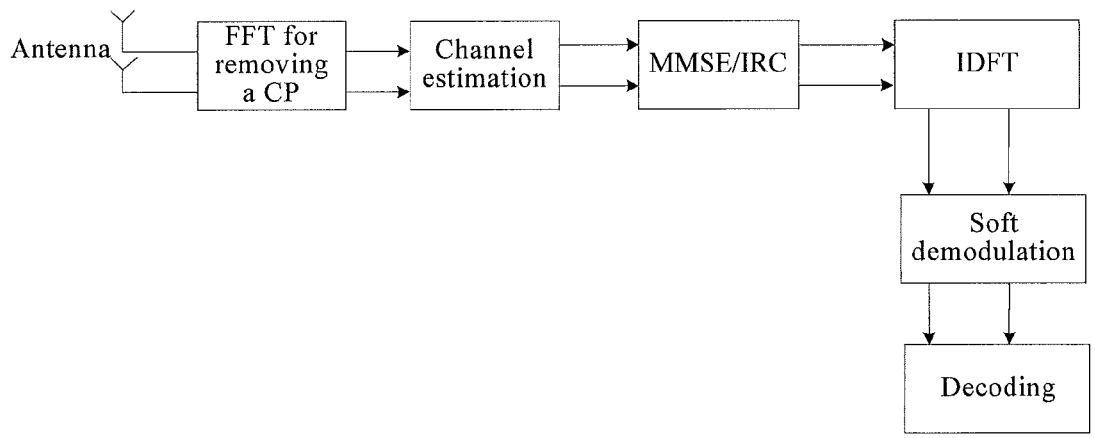

FIG. 3

A cooperative base station selects, according to strength of a signal received from a served user and strength of a signal received by a serving base station from an interfering user in the cooperative base station, a type of a backhaul signal ~ 401

The cooperative base station transmits the backhaul signal to the serving base station, so that the serving base station Combines, at different stages of baseband processing and according to a type of each backhaul signal, a backhaul signal of a corresponding type and a user signal received from each user ~ 402

FIG. 4

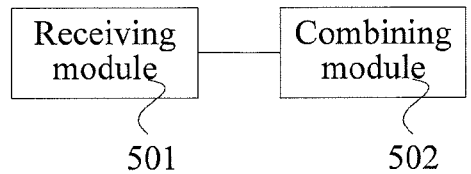

FIG. 5

METHOD AND BASE STATION FOR COORDINATING CELL INTERFERENCE

CROSS-REFERENCE TO RELATED APPLICATIONS

This application is a continuation of International Application No. PCT/CN2011/074753, filed on May 27, 2011, which is hereby incorporated by reference in its entirety.

TECHNICAL FIELD

Embodiments of the present invention relate to communications technologies, and in particular, to a method and a base station for coordinating cell interference.

BACKGROUND

Currently, capacity of a wireless mobile communication system is mainly restricted by inter-cell interference. To solve this problem, numerous researchers have put forward a concept of mutual cooperation between base stations to make full use of signals propagated across a cell boundary instead of regarding these signals as interference or noise, thereby improving spectral efficiency and system coverage. From an operator's angle, a major cost of the cooperation between the base stations comes from a backhaul (Backhaul) facility that connects the base stations to each other. Therefore, determining an effective backhaul cooperation policy becomes a key to ensuring a lowest possible cost in upgrading the backhaul facility between the base stations.

In the prior art, information transmitted by the backhaul between the base stations is usually one type of the following information: receive signals after quantization processing, estimation signals after equalization processing, bit information after decoding processing, and soft bit information after soft demodulation. For example, when receive signals after quantization processing are transmitted, optimal performance of the cooperation between the base stations can be acquired in an interference scenario, and required backhaul capacity is relatively large; or when decoded bit information is transmitted, required backhaul capacity is relatively small. In the prior art, some coding technologies are further utilized to perform compression coding on transmitted data, so as to improve backhaul transmission efficiency.

During the implementation of the present invention, the inventor finds that at least the following defect exists in the prior art: The performance of the cooperation between the base stations and the backhaul capacity are not comprehensively considered in the prior art, thereby causing low backhaul transmission efficiency.

SUMMARY

Embodiments of the present invention provide a method and a base station for coordinating cell interference, so as to maximally utilize backhaul transmission capacity and improve backhaul transmission efficiency.

To achieve the foregoing objective, an embodiment of the present invention provides a method for coordinating cell interference, which includes:

receiving each backhaul signal transmitted by each cooperative base station, where the backhaul signal is determined by the cooperative base station according to strength of a signal received from a served user and strength of a signal received by a serving base station from an interfering user in the cooperative base station; and combining, at different stages of baseband processing and according to a type of each backhaul signal, a backhaul signal of a corresponding type and a user signal received from each user.

An embodiment of the present invention provides a base station, which includes:

a receiving module, configured to receive each backhaul signal transmitted by each cooperative base station, where the backhaul signal is determined by the cooperative base station according to strength of a signal received from a served user and strength of a signal received by a serving base station from an interfering user in the cooperative base station; and a combining module, configured to combine, at different stages of baseband processing and according to a type of each backhaul signal, a backhaul signal of a corresponding type and a user signal received from each user.

According to the method for coordinating cell interference and the base station that are provided in the embodiments of the present invention, a cooperative base station transmits a backhaul signal of a corresponding type to a serving base station, where the backhaul signal is selected by the cooperative base station according to strength of a signal received by the cooperative base station from a served user and strength of a signal received by the serving base station from an interfering user; and the serving base station combines, at different stages of baseband processing and according to the type of the received backhaul signal, the received backhaul signal and a user signal. In the embodiments, backhaul transmission capacity is maximally utilized, backhaul transmission efficiency is improved, and relatively high performance is obtained.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

FIG. 1 is a flowchart of a method for coordinating cell interference according to a first embodiment of the present invention;

FIG. 2 is a schematic system architecture diagram of a method for coordinating cell interference according to a first embodiment of the present invention;

FIG. 3 is a schematic diagram of a signal processing procedure in a method for coordinating cell interference according to a first embodiment of the present invention;

FIG. 4 is a flowchart of a method for coordinating cell interference according to a second embodiment of the present invention;

FIG. 5 is a schematic structural diagram of a base station according to a first embodiment of the present invention.

DESCRIPTION OF EMBODIMENTS

Figure 6:
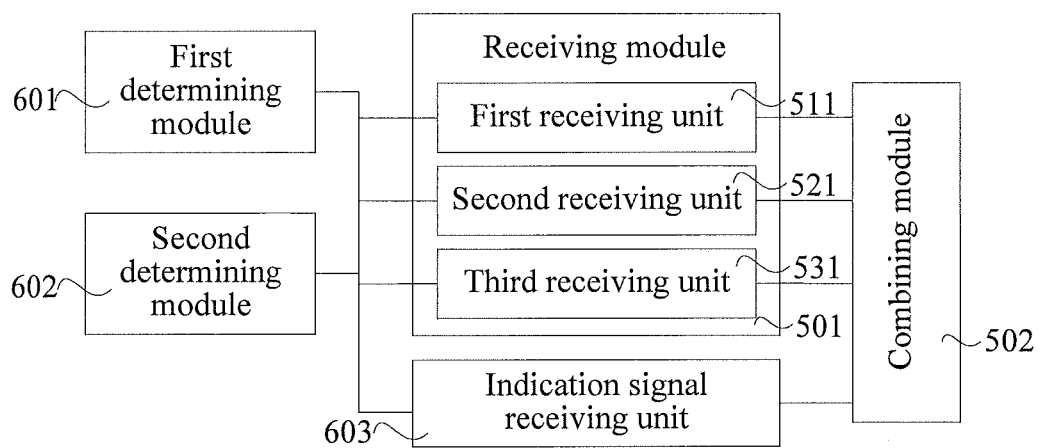
FIG. 6 is a schematic structural diagram of a base station according to a second embodiment of the present invention.

To make the objectives, technical solutions, and advantages of the embodiments of the present invention more comprehensible, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

FIG. 3 is a schematic diagram of a signal processing procedure in a method for coordinating cell interference according to a first embodiment of the present invention. As shown in FIG. 3, a signal processing procedure of a base station may include fast Fourier transform (Fast Fourier Transform; hereinafter briefly referred to as FFT) for removing a cyclic prefix (Cyclic Prefix; hereinafter briefly referred to as CP), channel estimation (Channel Est), minimum mean square error (Minimum Mean Square Error; hereinafter briefly referred to as MMSE)/interference rejection combining (Interference Rejection hereinafter briefly referred to as Combining; IRC), inverse discrete Fourier transform (Inverse Discrete Fourier Transform; hereinafter briefly referred to as IDFT), soft demodulation (Demodu.), and decoding (Decod.). A signal received from an antenna is a quantized receive signal, that is, a receive signal of a time domain; a signal after the FFT processing for removing a CP is a receive signal of a frequency domain; a signal after the channel estimation and MMSE/IRC processing is an estimation signal after equalization processing; a signal after the IDFT and Demodu. processing is soft bit information after the soft demodulation; and a signal after the Decod. processing is a bit signal after decoding processing.

FIG. 1 is a flowchart of a method for coordinating cell interference according to a first embodiment of the present invention. As shown in FIG. 1, this embodiment provides a method for coordinating cell interference. In this embodiment, the technical solutions of the present invention are described from a serving base station side. The method for coordinating cell interference that is provided in this embodiment may specifically include the following steps:

Step 101: A serving base station receives each backhaul signal transmitted by each cooperative base station, where the backhaul signal is determined by the cooperative base station according to strength of a signal received from a served user and strength of a signal received by a serving base station from an interfering user in the cooperative base station.

FIG. 2 is a schematic system architecture diagram of a method for coordinating cell interference according to a first embodiment of the present invention. As shown in FIG. 2, it is assumed that a network includes M+1 base stations, that is, a base station 0, a base station 1, a base station 2, . . . , and a base station M; and K users, that is, a user 1, a user 2, . . . , and a user K. The served user is the user 1, and the interfering user is another user except the served user among the user 2 to the user K. A number of a base station in which the served user resides is 0, that is, the base station 0 is the serving base station, and the base station 1 to the base station M are cooperative base stations of the serving base station, and may also be called cooperative points.

In this embodiment, a backhaul link specifically refers to a link between a serving base station and a cooperative base station, and a backhaul signal is a signal transmitted by the cooperative base station to the serving base station on the backhaul link. The serving base station selects the base station 1 to the base station M as cooperative points according to measured signal strength of a reference signal receiving power (Reference Signal Receiving Power; hereinafter briefly referred to as RSRP) cooperative point. For example, a base station whose RSRP signal strength value lies within a set typical strength range may be selected as a cooperative base station, or a base station whose physical distance from the serving base station lies within a set typical distance range may be selected as a cooperative base station. All the cooperative base stations are capable of receiving signals from the user 1, the user 2, . . . , and the user K, where the user 1 is a served user of the serving base station 0, and the rest users are interfering users.

Further, in this embodiment, the following step may be further specifically included: The cooperative base station determines, by comparing the strength of the signal received from the served user with a preset first strength threshold, whether to transmit the signal received from the served user to the serving base station. Alternatively, the serving base station determines, by comparing the strength of the signal received from the interfering user in the cooperative base station with a preset second strength threshold, whether to transmit the signal received from the interfering user in the cooperative base station to the serving base station.

In this embodiment, the serving base station receives the backhaul signal transmitted by each cooperative base station. A type of the backhaul signal transmitted by each cooperative base station may vary. A cooperative base station selects and determines, according to strength of a signal received by the cooperative base station itself from the served user and strength of a signal received by the serving base station from an interfering user in the cooperative base station, a type of a backhaul signal. The serving base station specifically determines, according to the strength of the signal received from the interfering user in a cooperative cell, whether the cooperative base station should send the backhaul signal to the serving base station. That is to say, when the cooperative base station transmits a signal to the serving base station, which type of a backhaul signal to be transmitted to the serving base station is determined according to strength of a received signal and strength of an interfering signal, unlike the prior art in which the cooperative base station transmits all received signals to the serving base station.

Specifically, in this embodiment, the type of the backhaul signal received by the serving base station from each cooperative base station may be a signal from the served user and/or a signal from an interfering user, and the backhaul signal includes but is not limited to a receive signal after quantization processing, an estimation signal after equalization processing, bit information after decoding processing, or soft bit information after soft demodulation. That is to say, the backhaul signal transmitted by the cooperative base station may be a signal to be transmitted selected by the cooperative base station according to its actual situation to help the served user acquire a signal combination gain and an interference suppression gain, so as to maximally utilize backhaul transmission capacity and obtain relatively high performance. In this embodiment, the backhaul signal is determined by the cooperative base station according to the strength of the signal received from the served user and the strength of the signal received by the serving base station from the interfering user in the cooperative base station.

More specifically, the cooperative base station determines, by comparing the strength of the signal received from the served user with the preset first strength threshold, a type of a backhaul signal to be transmitted to the serving base station; or the serving base station determines, by comparing the strength of the signal received from the interfering user in the cooperative base station with the preset second strength threshold, a type of a backhaul signal to be transmitted by the cooperative base station to the serving base station. In this embodiment, the first strength threshold and the second strength threshold may be specifically set according to an actual situation, and are mainly set according to values of strength of signals that can be received in different scenarios. For example, when strength of a signal from the served user is 5, the strength of the signal is considered to be relatively high, and the first strength threshold may be set to 5; and when strength of a signal from an interfering user is 2, the strength of the signal is considered to be relatively low, and the second strength threshold may be set to 2; or the first strength threshold and the second strength threshold may be set to a same value, such as 3, so that when strength of a signal is greater than 3, it indicates that the signal is relatively strong, or when strength of a signal is smaller than 3, it indicates that the signal is relatively weak.

More specifically, when the strength of the signal received by the cooperative base station from the served user is greater than the preset first strength threshold and the strength of the signal received by the serving base station from the interfering user in the cooperative base station is smaller than the preset second strength threshold, step 101 may specifically be: receiving a backhaul signal transmitted by the cooperative base station, where the backhaul signal is the signal from the served user. Here, the first strength threshold and the second strength threshold may be set according to an actual situation, or may be set to a same numerical value. Still referring to FIG. 2, for example, strength $h_{1,1}$ of a signal received by the cooperative base station 1 from the served user 1 is very high, that is, $h_{1,1}$ is greater than the first strength threshold, a user of a cell in which the cooperative base station 1 resides is the served user 1, and the served user 1 is not an interfering user for the serving base station 0. In this case, strength of a signal received by the serving base station 0 from an interfering user is 0, that is, smaller than the second strength threshold. In this case, a backhaul signal transmitted by the cooperative base station 1 to the serving base station 0 includes only the signal from the served user 1, and signals from other interfering users are not transmitted. In the foregoing example, because power of the signal received by the cooperative base station 1 from the served user is very high while signals received from other users are very weak, only the signal from the served user is selected and transmitted to the serving base station, so that the serving base station obtains a signal combination gain. Further, a signal type of the backhaul signal received by the serving base station in this step may be an estimation signal after equalization processing, soft bit information after soft demodulation, or bit information after decoding processing. Because all of the estimation signal after equalization processing, the soft bit information after soft demodulation, and the bit information after decoding processing can provide energy for the signal combination gain, the cooperative base station may provide, by transmitting a backhaul signal of any one of the foregoing three types to the serving base station, convenience for the serving base station to calculate the signal combination gain, so as to improve performance of cooperation between the base stations.

Alternatively, when the strength of the signal received by the cooperative base station from the served user is greater than the preset first strength threshold and the strength of the signal received by the serving base station from the interfering user in the cooperative base station is greater than the preset second strength threshold, step 101 may specifically be: receiving a backhaul signal transmitted by the cooperative base station, where the backhaul signal may specifically be the signal from the served user plus the signal from the interfering user in the cooperative base station. For example, strength $h_{2,1}$ of a signal received by the cooperative base station 2 from the served user 1 is very high, that is, $h_{2,1}$ is greater than the first strength threshold, and a user of a cell in which the cooperative base station 1 resides is the user 2, who is an interfering user for the serving base station 0; and strength $h_{0,2}$ of a signal received by the serving base station from the interfering user 2 is also very high, that is, $h_{0,2}$ is greater than the second strength threshold. In this case, backhaul signals transmitted by the cooperative base station 2 to the serving base station include the signal from the served user 1 and the signal from the interfering user 2. In the foregoing example, because the cooperative base station 2 and the serving base station 0 simultaneously receive the signals with relatively high signal strength from the served user 1 and the interfering user 2, and therefore select to simultaneously transmit the signals from the served user 1 and the interfering user 2 to the serving base station, so that the serving base station 0 simultaneously obtains a signal combination gain and an interference suppression gain. Further, in this step, the signal from the served user that is received by the serving base station and transmitted by the cooperative base station may specifically be a receive signal of the served user after quantization processing or bit information of the served user after decoding processing; and the signal from the interfering user that is received by the serving base station may be a receive signal of the interfering user after quantization processing or bit information of the interfering user after decoding processing. Because both the strength of the signal from the served user and the strength of the signal from the interfering user are relatively high, the cooperative base station transmits a signal that provides convenience for calculating the signal combination gain and the interference suppression gain as a backhaul signal to the serving base station, so that the serving base station can simultaneously obtain the signal combination gain and the interference suppression gain.

Alternatively, when the strength of the signal received by the cooperative base station from the served user is smaller than the preset first strength threshold and the strength of the signal received by the serving base station from the interfering user in the cooperative base station is greater than the preset second strength threshold, step 101 may specifically be: receiving a backhaul signal transmitted by the cooperative base station, where the backhaul signal may specifically be the signal from the interfering user in the cooperative base station. For example, strength $h_{3,1}$ of a signal received by the cooperative base station 3 from the served user 1 is very weak, that is, $h_{3,1}$ is smaller than the first strength threshold, and a user of a cell in which the cooperative base station 3 resides is the user 3, who is an interfering user for the serving base station 0; while strength $h_{0,3}$ of a signal received by the serving base station from the interfering user 3 is very strong, that is, $h_{0,3}$ is greater than the second strength threshold. In this case, a backhaul signal transmitted by the cooperative base station 3 to the serving base station includes only the signal from the interfering user 3. In the forgoing example, because the signal received by the cooperative base station 3 from the served user 1 is weak while the signal received by the serving base station 0 from the interfering user 3 is relatively strong, the signal from the interfering user 3 is selected and transmitted to the serving base station, so that the serving base station 0 can obtain an interference suppression gain. Further, the received signal from the interfering user that is transmitted by the cooperative base station in this step may specifically be a receive signal of the interfering user after quantization processing. Because the receive signal after quantization processing can provide energy for the interference suppression gain, the cooperative base station may provide, by transmitting a backhaul signal of this type to the serving base station, convenience for the serving base station to calculate the interference suppression gain, so as to improve performance of cooperation between the base stations.

Alternatively, when the strength of the signal received by the cooperative base station from the served user is smaller than the preset first strength threshold and the strength of the signal received by the serving base station from the interfering user in the cooperative base station is smaller than the preset second strength threshold, the following step may be further included in this embodiment: Receive a backhaul indication signal transmitted by the cooperative base station, where the backhaul indication signal is used to instruct the cooperative base station not to send a backhaul signal to the serving base station, that is, the cooperative base station may notify the serving base station that no information will be transmitted to the serving base station. For example, strength $h_{M,1}$, of a signal received by the cooperative base station M from the served user 1 is very weak, that is, $h_{M,1}$, is smaller than the first strength threshold, and a user of a cell in which the cooperative base station M resides is the user M, who is an interfering user for the serving base station 0; and strength $h_{0,M}$ of a signal received by the serving base station from the interfering user M is also very weak, that is, $h_{0,M}$ is smaller than the second strength threshold. In this case, the cooperative base station M does not transmit any useful signal to the serving base station. In the foregoing example, because the signal received by the cooperative base station M from the served user 1 is very weak and the signal received by the serving base station from the interfering user M is also very weak, the signal received by the cooperative base station M from the served user 1 is of little help for the serving base station 0 to acquire a signal combination gain; and interference generated by the interfering user M to the serving base station 0 is also very small and the interfering user M has a very minor impact on the serving base station 0 in terms of acquiring an interference suppression gain. Therefore, the cooperative base station M does not need to transmit any signal to the serving base station.

Step 102: The serving base station combines, at different stages of baseband processing and according to a type of each backhaul signal, a backhaul signal of a corresponding type and a user signal received from each user.

After receiving the backhaul signal from each cooperative base station, the serving base station combines, at different stages of corresponding baseband processing and according to the type of the backhaul signal, the backhaul signal and a user signal received by the serving base station itself from each user. As can be known from the foregoing description, backhaul signals received by the serving base station are classified according to different stages of the baseband processing. Therefore, after receiving a backhaul signal, during the combining of the backhaul signal and the user signal received by the serving base station itself from each user, the serving base station combines the backhaul signal of a specific type that corresponds to a specific stage and a user signal at the corresponding stage.

Specifically, still with reference to FIG. 3, when the backhaul signal is a receive signal after quantization processing, if the serving base station receives a user signal of a frequency domain or a time domain, the serving base station combines the backhaul signal and the user signal; when the backhaul signal is soft bit information after soft demodulation, the serving base station performs soft demodulation processing on the user signal and then combines the backhaul signal and the user signal; when the backhaul signal is an estimation signal after equalization processing, the serving base station performs MMSE/IRC processing on the user signal and then combines the backhaul signal and the user signal; or when the backhaul signal is bit information after decoding processing, the serving base station performs decoding processing on the user signal and then combines the backhaul signal and the user signal. In this embodiment, the combining is combining the backhaul signal into the user signal, so as to combine the two into one signal to be transmitted to the serving base station.

This embodiment provides a method for coordinating cell interference. A cooperative base station transmits a backhaul signal of a corresponding type to a serving base station, where the backhaul signal is selected by the cooperative base station according to strength of a signal received by the cooperative base station from a served user and strength of a signal received by the serving base station from an interfering user; and the serving base station combines, at different stages of baseband processing and according to the type of the received backhaul signal, the received backhaul signal and a user signal. In this embodiment, backhaul transmission capacity is maximally utilized, backhaul transmission efficiency is improved, and relatively high performance is obtained.

FIG. 4 is a flowchart of a method for coordinating cell interference according to a second embodiment of the present invention. As shown in FIG. 4, this embodiment provides a method for coordinating cell interference. In this embodiment, the technical solutions of the present invention are described from a cooperative base station side. The method for coordinating cell interference that is provided in this embodiment may specifically include the following steps:

Step 401: A cooperative base station selects, according to strength of a signal received from a served user and strength of a signal received by a serving base station from an interfering user in the cooperative base station, a type of a backhaul signal.

In this step, the cooperative base station selects, according to strength of a signal received by the cooperative base station itself from the served user and the strength of the signal received by the serving base station from the interfering user in the cooperative base station, the type of the backhaul signal. That is to say, the cooperative base station does not transmit all received signals to the serving base station but determines, according to strength of a received signal and strength of an interfering signal, to transmit a backhaul signal of which type to the serving base station. Specifically, the type of the backhaul signal that is selected by the cooperative base station and will be transmitted to the serving base station may be the signal from the served user and/or the signal from the interfering user; and the backhaul signal includes but is not limited to a receive signal after quantization processing, an estimation signal after equalization processing, bit information after decoding processing, or soft bit information after soft demodulation. That is to say, the cooperative base station selects, according to its actual situation, to transmit a signal that helps the served user acquire a signal combination gain and an interference suppression gain.

Specifically, when the strength of the signal received by the cooperative base station from the served user is greater than a preset first strength threshold and the strength of the signal received by the serving base station from the interfering user in the cooperative base station is smaller than a preset second strength threshold, the backhaul signal selected by the cooperative base station is the signal from the served user; and the signal from the served user is an estimation signal after equalization processing, soft bit information after soft demodulation, or bit information after decoding processing, so that a serving base station acquires a signal combination gain. Alternatively, when the strength of the signal received by the cooperative base station from the served user is greater than a preset first strength threshold and the strength of the signal received by the serving base station from the interfering user in the cooperative base station is greater than a preset second strength threshold, the backhaul signal selected by the cooperative base station is the signal from the served user plus the signal from the interfering user; and the signal from the served user may be a receive signal after quantization processing or bit information after decoding processing, and the signal from the interfering user may be a receive signal after quantization processing or bit information after decoding processing, so that a serving base station simultaneously obtains a signal combination gain and an interference suppression gain. Alternatively, when the strength of the signal received by the cooperative base station from the served user is smaller than a preset first strength threshold and the strength of the signal received by the serving base station from the interfering user in the cooperative base station is greater than a preset second strength threshold, the backhaul signal selected by the cooperative base station is the signal from the interfering user; and the signal from the interfering user may be a receive signal after quantization processing, so that the serving base station can obtain an interference suppression gain. Alternatively, when the strength of the signal received by the cooperative base station from the served user is smaller than a preset first strength threshold and the strength of the signal received by the serving base station from the interfering user in the cooperative base station is smaller than a preset second strength threshold, the cooperative base station sends a backhaul indication signal to the serving base station, so as to indicate that no backhaul signal will be sent to the serving base station any longer.

Step 402: The cooperative base station transmits the backhaul signal to the serving base station, so that the serving base station combines, at different stages of baseband processing and according to a type of each backhaul signal, a backhaul signal of a corresponding type and a user signal received from each user.

The cooperative base station transmits the backhaul signal selected in step 401 to the serving base station. After receiving the backhaul signal transmitted by each cooperative base station, the serving base station combines, at different stages of baseband processing and according to different types of backhaul signals, the backhaul signal and a user signal received by the serving base station from each user. For a specific combining procedure, reference may be made to step 102 and no further details are provided herein.

This embodiment provides a method for coordinating cell interference. A cooperative base station transmits a backhaul signal of a corresponding type to a serving base station, where the backhaul signal is selected by the cooperative base station according to strength of a signal received by the cooperative base station from a served user and strength of a signal received by the serving base station from an interfering user; and the serving base station combines, according to the type of the received backhaul signal, the received backhaul signal and a user signal at different stages of baseband processing. In this embodiment, on a basis of maximizing performance of cooperation between the base stations as far as possible, backhaul transmission capacity is maximally utilized, backhaul transmission efficiency is improved, and relatively high performance is obtained.

Persons of ordinary skill in the art may understand that, all or a part of the steps of the foregoing method embodiments may be implemented by a program instructing relevant hardware. The foregoing programs may be stored in a computer readable storage medium. When the program runs, the foregoing steps included in the method embodiments are performed. The foregoing storage medium includes various media capable of storing program codes, such as a ROM, a RAM, a magnetic disk or an optical disk.

FIG. 5 is a schematic structural diagram of a base station according to a first embodiment of the present invention. As shown in FIG. 5, this embodiment provides a base station, which may specifically be a serving base station and capable of executing each step in the foregoing first method embodiment, and no further details are provided herein. The base station provided in this embodiment may specifically include a receiving module 501 and a combining module 502. The receiving module 501 is configured to receive each backhaul signal transmitted by each cooperative base station, where the backhaul signal is determined by the cooperative base station according to strength of a signal received from a served user and strength of a signal received by a serving base station from an interfering user in the cooperative base station. The combining module 502 is configured to combine, at different stages of baseband processing and according to a type of each backhaul signal, a backhaul signal of a corresponding type and a user signal received from each user.

FIG. 6 is a schematic structural diagram of a base station according to a second embodiment of the present invention. As shown in FIG. 6, this embodiment provides a base station, which may specifically be a serving base station and capable of executing each step in the foregoing first method embodiment, and no further details are provided herein. The base station provided in this embodiment may further include a first determining module 601 or a second determining module 602. The first determining module 601 is configured to determine, by comparing the strength of the signal received by the cooperative base station from the served user with a preset first strength threshold, whether to transmit the signal received from the served user to the serving base station. The second determining module 602 is configured to determine, by comparing the strength of the signal received from the interfering user in the cooperative base station with a preset second strength threshold, whether to transmit the signal received from the interfering user in the cooperative base station to the serving base station.

Further, in this embodiment, the first determining module 601 is specifically configured to determine, by comparing the strength of the signal received by the cooperative base station from the served user with a preset first strength threshold, a type of a backhaul signal to be transmitted to the serving base station. The second determining module 602 is specifically configured to determine, by comparing the strength of the signal received from the interfering user in the cooperative base station with the preset second strength threshold, a type of a backhaul signal to be transmitted by the cooperative base station to the serving base station.

Specifically, in this embodiment, the receiving module 501 may specifically include a first receiving unit 511, a second receiving unit 521, or a third receiving unit 531. The first receiving unit 511 is configured to receive, when the strength of the signal received by the cooperative base station from the served user is greater than the preset first strength threshold and the strength of the signal received by the serving base station from the interfering user in the cooperative base station is smaller than the preset second strength threshold, a backhaul signal transmitted by the cooperative base station, where the backhaul signal is the signal from the served user. The second receiving unit 521 is configured to receive, when the strength of the signal received by the cooperative base station from the served user is greater than the preset first strength threshold and the strength of the signal received by the serving base station from the interfering user in the cooperative base station is greater than the preset second strength threshold, a backhaul signal transmitted by the cooperative base station, where the backhaul signal is the signal from the served user plus the signal from the interfering user in the cooperative base station. The third receiving unit 531 is configured to receive, when the strength of the signal received by the cooperative base station from the served user is smaller than the preset first strength threshold and the strength of the signal received by the serving base station from the interfering user in the cooperative base station is greater than the preset second strength threshold, a backhaul signal transmitted by the cooperative base station, where the backhaul signal is the signal from the interfering user in the cooperative base station.

Further, in this embodiment, the base station may further include an indication signal receiving module 603. The indication signal receiving module 603 is configured to receive, when the strength of the signal received by the cooperative base station from the served user is smaller than the preset first strength threshold and the strength of the signal received by the serving base station from the interfering user in the cooperative base station is smaller than the preset second strength threshold, a backhaul indication signal sent by the cooperative base station, where the backhaul indication signal is used to instruct the cooperative base station not to send a backhaul signal to the serving base station.

More specifically, in this embodiment, the backhaul signal received by the first receiving unit 511 is specifically an estimation signal of the served user after equalization processing, soft bit information of the served user after soft demodulation, or bit information of the served user after decoding processing; or the backhaul signals received by the second receiving unit 521 are specifically a receive signal of the served user after quantization processing or bit information of the served user after decoding processing, and a receive signal of the interfering user after quantization processing or bit information of the interfering user after decoding processing; or the backhaul signal received by the third receiving unit 531 is specifically a receive signal of the interfering user after quantization processing.

This embodiment provides a base station, for which a receiving module and a combining module are arranged. The receiving module receives a backhaul signal transmitted by a cooperative base station, where the backhaul signal is selected by the cooperative base station according to strength of a signal received by the cooperative base station from a served user and strength of a signal received by a serving base station from an interfering user; and the combining module combines, at different stages of baseband processing and according to a type of the received backhaul signal, the received backhaul signal and a user signal. In this embodiment, on a basis of maximizing performance of cooperation between the base stations as far as possible, backhaul transmission capacity is maximally utilized, backhaul transmission efficiency is improved, and relatively high performance is obtained.

Finally, it should be noted that, the foregoing embodiments are merely intended for describing the technical solutions of the present invention rather than limiting the present invention. Although the present invention is described in detail with reference to the foregoing embodiments, persons of ordinary skill in the art should understand that, they may still make modifications to the technical solutions described in the foregoing embodiments, or make equivalent replacements to some technical features thereof, as long as these modifications or replacements do not cause the essence of corresponding technical solutions to depart from the spirit and scope of the technical solutions of the embodiments of the present invention.

What is claimed is:

1. A method for coordinating cell interference, comprising:
   receiving each backhaul signal transmitted by each cooperative base station, wherein the backhaul signal is determined by the cooperative base station according to strength of a signal received from a served user and strength of a signal received by a serving base station from an interfering user in the cooperative base station; and
   combining, at different stages of baseband processing and according to a type of each backhaul signal, a backhaul signal of a corresponding type and a user signal received from each user.

2. The method according to claim 1, further comprising:
   determining, by the cooperative base station, by comparing the strength of the signal received from the served user with a preset first strength threshold, whether to transmit the signal received from the served user to the serving base station; or
   determining, by the serving base station, by comparing the strength of the signal received from the interfering user in the cooperative base station with a preset second strength threshold, whether to transmit the signal received from the interfering user in the cooperative base station to the serving base station.

3. The method according to claim 2, wherein the determining, by the cooperative base station, by comparing the strength of the signal received from the served user with a preset first strength threshold, whether to transmit the signal received from the served user to the serving base station includes:
   determining, by the cooperative base station, by comparing the strength of the signal received from the served user with the preset first strength threshold, a type of a backhaul signal to be transmitted to the serving base station; or
   the determining, by the serving base station, by comparing the strength of the signal received from the interfering user in the cooperative base station with a preset second strength threshold, whether to transmit the signal received from the interfering user in the cooperative base station to the serving base station includes:
   determining, by the serving base station, by comparing the strength of the signal received from the interfering user in the cooperative base station with the preset second strength threshold, a type of a backhaul signal to be transmitted by the cooperative base station to the serving base station.

4. The method according to claim 3, wherein when the strength of the signal received by the cooperative base station from the served user is greater than the preset first strength threshold and the strength of the signal received by the serving base station from the interfering user in the cooperative base station is smaller than the preset second strength threshold, the receiving each backhaul signal transmitted by each cooperative base station comprises:
   receiving a backhaul signal transmitted by the cooperative base station, wherein the backhaul signal is the signal from the served user.

5. The method according to claim 4, wherein the backhaul signal is an estimation signal of the served user after equalization processing, soft bit information of the served user after soft demodulation, or bit information of the served user after decoding processing.

6. The method according to claim 3, wherein when the strength of the signal received by the cooperative base station from the served user is greater than the preset first strength threshold and the strength of the signal received by the serving base station from the interfering user in the cooperative base station is greater than the preset second strength threshold, the receiving each backhaul signal transmitted by each cooperative base station comprises:

receiving a backhaul signal transmitted by the cooperative base station, wherein the backhaul signal is the signal from the served user plus the signal from the interfering user in the cooperative base station.

7. The method according to claim 6, wherein the backhaul signals are a receive signal of the served user after quantization processing or bit information of the served user after decoding processing, and a receive signal of the interfering user after quantization processing or bit information of the interfering user after decoding processing.

8. The method according to claim 3, wherein when the strength of the signal received by the cooperative base station from the served user is smaller than the preset first strength threshold and the strength of the signal received by the serving base station from the interfering user in the cooperative base station is greater than the preset second strength threshold, the receiving each backhaul signal transmitted by each cooperative base station comprises:

receiving a backhaul signal transmitted by the cooperative base station, wherein the backhaul signal is the signal from the interfering user in the cooperative base station.

9. The method according to claim 8, wherein the backhaul signal is a receive signal of the interfering user after quantization processing.

10. The method according to claim 3, wherein when the strength of the signal received by the cooperative base station from the served user is smaller than the preset first strength threshold and the strength of the signal received by the serving base station from the interfering user in the cooperative base station is smaller than the preset second strength threshold, the method further comprises:

receiving a backhaul indication signal sent by the cooperative base station, wherein the backhaul indication signal is used to instruct the cooperative base station not to send a backhaul signal to the serving base station.

11. A base station, comprising:

a receiving module, configured to receive each backhaul signal transmitted by each cooperative base station, wherein the backhaul signal is determined by the cooperative base station according to strength of a signal received from a served user and strength of a signal received by a serving base station from an interfering user in the cooperative base station; and a combining module, configured to combine, at different stages of baseband processing and according to a type of each backhaul signal, a backhaul signal of a corresponding type and a user signal received from each user.

12. The base station according to claim 11, further comprising:

a first determining module, configured to determine, by comparing the strength of the signal received by the cooperative base station from the served user with a preset first strength threshold, whether to transmit the signal received from the served user to the serving base station; or a second determining module, configured to determine, by comparing the strength of the signal received from the interfering user in the cooperative base station with a preset second strength threshold, whether to transmit the signal received from the interfering user in the cooperative base station to the serving base station.

13. The base station according to claim 12, wherein the first determining module is configured to determine, by comparing the strength of the signal received by the cooperative base station from the served user with the preset first strength threshold, a type of a backhaul signal to be transmitted to the serving base station; or the second determining module is configured to determine, by comparing the strength of the signal received from the interfering user in the cooperative base station with the preset second strength threshold, a type of a backhaul signal to be transmitted by the cooperative base station to the serving base station.

14. The base station according to claim 13, wherein the receiving module comprises:

a first receiving unit, configured to receive, when the strength of the signal received by the cooperative base station from the served user is greater than the preset first strength threshold and the strength of the signal received by the serving base station from the interfering user in the cooperative base station is smaller than the preset second strength threshold, a backhaul signal transmitted by the cooperative base station, wherein the backhaul signal is the signal from the served user; or a second receiving unit, configured to receive, when the strength of the signal received by the cooperative base station from the served user is greater than the preset first strength threshold and the strength of the signal received by the serving base station from the interfering user in the cooperative base station is greater than the preset second strength threshold, a backhaul signal transmitted by the cooperative base station, wherein the backhaul signal is the signal from the served user plus the signal from the interfering user in the cooperative base station; or a third receiving unit, configured to receive, when the strength of the signal received by the cooperative base station from the served user is smaller than the preset first strength threshold and the strength of the signal received by the serving base station from the interfering user in the cooperative base station is greater than the preset second strength threshold, a backhaul signal transmitted by the cooperative base station, wherein the backhaul signal is the signal from the interfering user in the cooperative base station.

15. The base station according to claim 14, wherein the backhaul signal received by the first receiving unit is an estimation signal of the served user after equalization processing, soft bit information of the served user after soft demodulation, or bit information of the served user after decoding processing; or the backhaul signals received by the second receiving unit are a receive signal of the served user after quantization processing or bit information of the served user after decoding processing, and a receive signal of the interfering user after quantization processing or bit information of the interfering user after decoding processing; or the backhaul signal received by the third receiving unit is a receive signal of the interfering user after quantization processing.

16. The base station according to claim 13, further comprising:

an indication signal receiving module, configured to receive, when the strength of the signal received by the cooperative base station from the served user is smaller than the preset first strength threshold and the strength of the signal received by the serving base station from the interfering user in the cooperative base station is smaller than the preset second strength threshold, a backhaul indication signal sent by the cooperative base station, wherein the backhaul indication signal is used to instruct the cooperative base station not to send a backhaul signal to the serving base station.

\* \* \* \* \*